UNITED STATES PATENT OFFICE 2,516,854

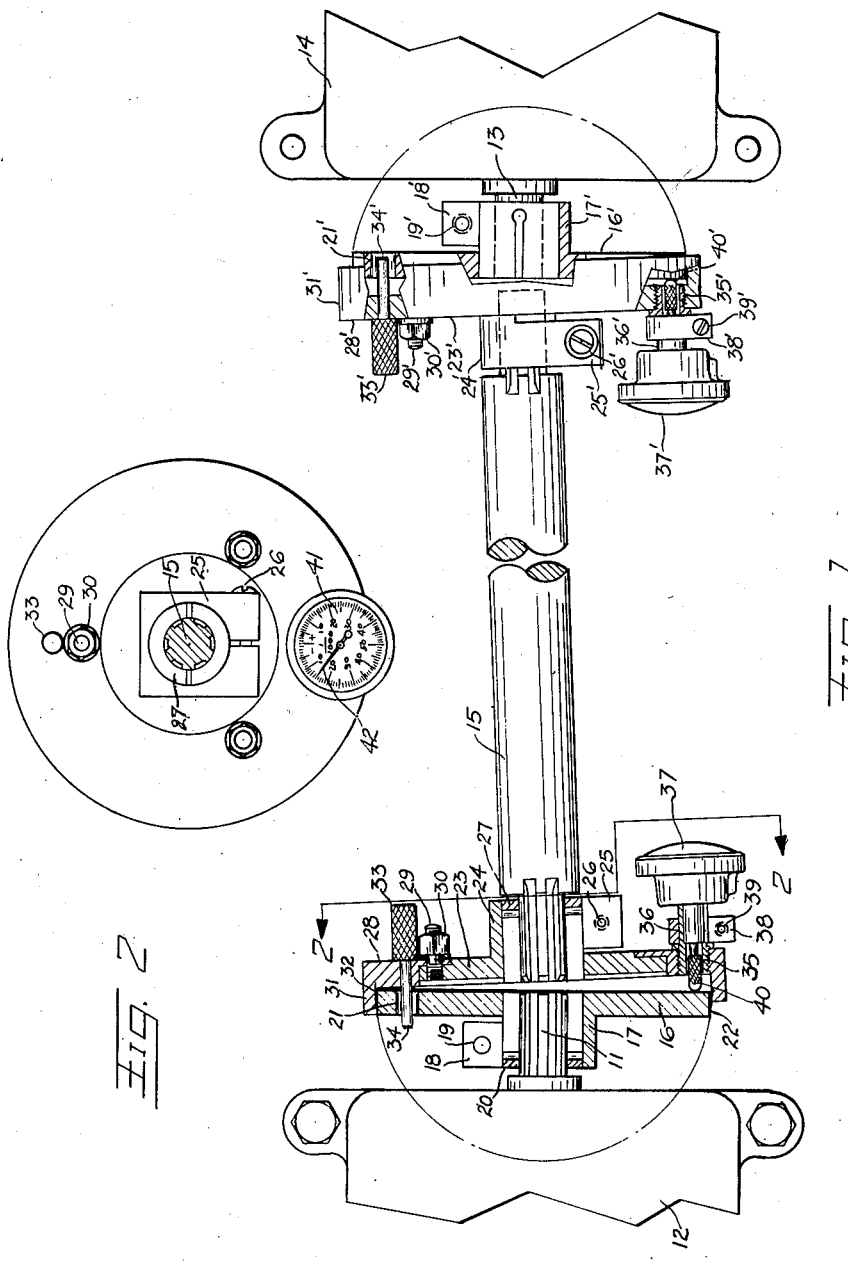

GAUGING APPARATUS FOR ALIGNING SHAFTS

Joseph B. Christian, New York, N. Y.

Application January 16, 1946, Serial No. 641,551

3 Claims. (Cl. 33—180)

(Granted under the act of March 3, 1883, as amended April 30, 1928; 370 O. G. 757)

This invention concerns an apparatus for determining misalignment of a pair of shafts and for aligning a pair of shafts, and particularly concerns an apparatus for determining misalignment of and for aligning a pair of shafts and an interconnecting shaft.

An object of the invention is to provide an apparatus that can be removably mounted on adjacent ends of a pair of shafts for indicating the degree and direction of angular misalignment of the shafts, whereby the correction necessary to bring the shafts into alignment can be computed and the shafts be redisposed into corrected aligned position.

Another object is to provide an apparatus that can be mounted on a pair of spaced shafts and an interconnecting shaft for indicating the degree and direction of angular misalignment of the shafts, whereby the correction necessary to bring the shafts into alignment can be computed and the shafts be redisposed into corrected aligned position.

Further objects and advantages of this invention, as well as its construction, arrangement and operation, will be apparent from the following description and claims in connection with the accompanying drawing, in which, Fig. 1 is a longitudinal view partly in section and partly in elevation of a preferred embodiment of the invention.

Fig. 2 is a transverse sectional view taken along line 2—2 of Fig. 1.

In the drawing there is shown a driving shaft 11 extending from a power unit 12, a driven shaft 13 extending into a unit 14, and an interconnecting shaft 15. Mounted upon driving shaft 11 is an indicating disc 16 provided with a collar 17 having a friction clamp 18, which can be tightened by means of a screw 19 upon a resilient bushing 20 on shaft 11. An aperture 21 is provided near the periphery of disc 16. The periphery of disc 16 is arced longitudinally as indicated at 22 with the arc having its center on the longitudinal axis of shaft 11.

Mounted upon shaft 15 is a disc-shaped adapter 23 having a collar 24 provided with a friction clamp 25, which can be tightened by means of a screw 26 upon a resilient bushing 27 mounted on shaft 15. Mounted upon the periphery of adapter 23 is a ring-shaped bearing 28, which is locked in place by means of studs 29 and nuts 30. Bearing 28 is provided with an annular rim 31, which extends toward indicating disc 16 and which is provided with a bearing surface 32 extending into contact with periphery 22 of indicating disc 16. Removably mounted in bearing 28 is a pin 33 having a shank 34, which extends through opening 21 in indicating disc 16 so that indicating disc 16 rotates together with adapter 23 and bearing 28.

Threaded into the periphery of bearing 28 is a bracket 35 having a split collar 36 within which is mounted a conventional type of contact indicator 37. A split clamp 38 is tightened by means of a screw 39 to secure contact indicator 37 within split collar 36. Indicator 37 is provided with a plunger 40, which extends into contact with indicating disc 16. Indicator 37 is provided with a dial face 41 and an indicating hand 42.

Mounted on shaft 13 is an apparatus similar to that described as being mounted on shaft 11 and mounted on the end of interconnecting shaft 15 adjacent to shaft 13 is an apparatus similar to that described as being mounted on the interconnecting shaft 15 adjacent to shaft 11. Similar parts are given similar reference characters with the addition of a prime mark.

Operation of the device is as follows. When it is desired to bring driving shaft 11, driven shaft 13, and interconnecting shaft 15 into alignment, driving shaft 11 is first secured in place so that the axis thereof is established as a reference for alignment. Interconnecting shaft 15 is removed from its position between driving shaft 11 and driven shaft 13. Indicating discs 16 and 16' are then mounted on shafts 11 and 13 respectively. Indicating-disc bearings 28 and 28' are then placed over the ends of interconnecting shaft 15. Adapters 23 and 23' are then placed on interconnecting shaft 15 together with bushing 27 and its corresponding bushing (not shown) and are locked in place by means of screws 26 and 26'. Interconnecting shaft 15 is then moved into position between driving shaft 11 and driven shaft 13, and bearings 28 and 28' are slipped over discs 16 and 16' and are locked in place by means of nuts 30 and 30'. Driving pins 33 and 33' are then inserted in place.

Indicating shaft 15 is then slowly turned by hand with the result that adapter assemblies 23 and 23' and indicating discs 16 and 16' rotate together by means of pins 33 and 33'. As indicating disc 16 rotates the point thereon that is in contact with indicating plunger 40 describes a circle defining a plane perpendicular to shaft 11. Likewise as adapter 23 rotates, a point thereon describes a circle defining a plane perpendicular to shaft 15. The divergence between these two planes is indicated as shafts 11 and 15 rotate by indicator 37 through the action of plunger 40. For example, as seen to the left of Fig. 1, shafts 11 and 15 are out of alignment and rotation of the shafts causes a maximum divergence to be shown by indicator 37 when at the bottom of a revolution of the shafts, while a minimum of divergence is shown when the shafts are rotated through an angle of 180°. The proper correction can be estimated and shaft 15 relocated in alignment with shaft 11 by simply moving shaft 15 about an axis defined by a diameter of adapter 23 at right angles to the diameter drawn through the points of maximum and minimum deviation.

When shaft 15 is relocated into alignment with shaft 11 rotation of shafts 15 and 11 causes indicator 37 to give a constant reading.

Shaft 13 can be aligned with interconnecting shaft 15 by performing the same operation as described in connection with shafts 11 and 15.

When shafts 11, 15 and 13 are brought into alignment the apparatus can be disassembled and interconnecting shaft 15 coupled to shafts 11 and 13 for normal operation in conventional manner.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. An apparatus for indicating misalignment of and for aligning a pair of shafts comprising an indicating disc having a collar arranged to be mounted on the end of the first of the shafts and having a surface extending transversely with respect to the centerline of the shaft, means for locking said disc for rotation with said shaft, an adapter having a collar arranged to be mounted on the end of the second shaft adjacent said disc and having a radially extending flange and means for locking said collar for rotation with the shaft, a bearing mounted peripherally on said flange and having an annular rim extending into sliding engagement with the periphery of said indicating disc, means for locking said indicating disc and said adapter for rotation together, an indicator mounted on said adapter and having a plunger extending into contact with the transverse surface of said disc whereby rotation of said apparatus will afford an indication of the relative alignment of the shafts.

2. An apparatus for indicating misalignment of and for aligning a pair of shafts that are in approximate alignment, said apparatus comprising a first disc arranged to be mounted on the end of the first of the shafts, the first disc extending normally with respect to the axis of the first shaft, means for locking the first disc for rotation with the first shaft, a second disc arranged to be mounted on the end of the second shaft adjacent the first disc, the second disc extending normally with respect to the axis of the second shaft, the second disc having a peripheral flange adapted to extend about the periphery of the first disc, means for locking the second disc for rotation with the second shaft, means for locking the first disc and the second disc for rotation together, and an indicator mounted on one of the discs and extending into contact with the other of the discs.

3. An apparatus for indicating misalignment of and for aligning a pair of shafts comprising a first member arranged to be mounted on the end of the first of the shafts and having a portion extending radially with respect to the axis of the first shaft, means for locking the first member for rotation with the first shaft, a second member arranged to be mounted on the end of the second shaft adjacent the first member and having a portion extending radially with respect to the axis of the second shaft, means for locking the second member for rotation with the second shaft, means for locking the first and second members for rotation together, and an indicator mounted on the radial portion of one of said members and extending into contact with the radial portion of the other of said members.

JOSEPH B. CHRISTIAN.

REFERENCES CITED

The following references are of record in the file of this patent:

UNITED STATES PATENTS

| Number | Name | Date |
|---|---|---|
| 685,288 | Miller | Oct. 29, 1901 |
| 1,505,313 | Colwell | Aug. 19, 1924 |
| 1,970,092 | Hink | Aug. 14, 1934 |
| 2,006,013 | Claywell | June 25, 1935 |
| 2,167,361 | Haucke | July 25, 1939 |
| 2,366,394 | Gerber | Jan. 2, 1945 |